Patented July 6, 1943

2,323,706

UNITED STATES PATENT OFFICE 2,323,706

INTERPOLYMERS OF AN UNSATURATED ALKYD RESIN AND A 3-HYDROXY ALKENE-1 POLYESTER OF A POLYCARBOXYLIC ACID

Gaetano F. D'Alelio, Pittsfield, Mass., assignor to General Electric Company, a corporation of New York No Drawing. Application October 31, 1939,
Serial No. 302,170

16 Claims. (Cl. 260—42)

This invention relates to the production of new materials and more particularly to new interpolymerization products. The invention especially is concerned with compositions of matter comprising an interpolymer (copolymer) or interpolymers of at least one modified or unmodified polyhydric alcohol ester of an alpha unsaturated alpha beta polycarboxylic acid, which esters are designated generally hereafter for purpose of brevity as "unsaturated alkyd resins," and at least one 3-hydroxy alkene-1 polyester of the kind hereafter defined. These new compositions have valuable and characteristic properties that make them especially suitable for use in industry, for example in molding, laminating, casting, coating and adhesive applications and for other purposes.

The 3-hydroxy alkene-1 polyesters used in carrying the present invention into effect may be considered as being esterification products of a polycarboxylic acid with a 3-hydroxy alkene-1 having the graphic structure

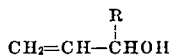

where R is a member of the class consisting of unsubstituted hydrocarbon radicals and substituted hydrocarbon radicals, for instance hydrocarbon radicals containing substituent groups such as halogeno, carboxy, aceto, carboalkoxy, acyloxy, alkoxy, aryloxy, nitro, acyl, nitrilo, aldehydo, etc. Thus, R may be, for instance, any alkyl radical such as methyl, ethyl, propyl, isopropyl, butyl, secondary butyl, isobutyl, amyl, isoamyl, hexyl, octyl, etc., any carbocyclic radical such as phenyl, cresyl, halo-phenyl, xylyl, tolyl, naphthyl, phenoxy ethyl, phenyl ethyl, phenyl propyl, cyclohexyl, ortho methyl cyclohexyl, etc. From the above formula it will be seen that polyesters, the alcohol radicals of which contain the grouping,

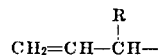

are embraced by this invention. The term "3-hydroxy alkene-1 polyester" as used generally herein and in the appended claims is intended to include within its meaning esterification products of a polycarboxylic acid, or an anhydride thereof if available, with the above-described alcohols. More specific examples of 3-hydroxy alkene-1 polyesters are 3-hydroxy butene-1 polyester, 3-hydroxy pentene-1 polyester, 3-hydroxy hexene-1 polyester, 3-hydroxy heptene-1 polyester, etc.

Illustrative of the polycarboxylic acids which may be used in preparing the 3-hydroxy alkene-1 polyesters are the saturated aliphatic polycarboxylic acids such as oxalic, malonic, succinic, adipic, glutaric, pimelic, sebacic, azelaic, suberic, tricarballylic, etc., the aromatic polycarboxylic acids, e. g., phthalic, benzoyl phthalic, terephthalic, benzophenone dicarboxylic, etc., the alpha unsaturated alpha beta polycarboxylic acids, e. g., maleic, monohalomaleic, fumaric, monohalofumaric, citraconic, mesaconic, acetylene dicarboxylic, aconitic, itaconic acid and its homologues as, for instance, alpha methyl itaconic acid, alpha alpha dimethyl itaconic acid, etc., hydroxy polycarboxylic acids, e. g., citric, tartaric, etc., the cycloaliphatic polycarboxylic acids, for example, the cyclopropane dicarboxylic acids, the cyclohexane dicarboxylic acids, the cyclohexene dicarboxylic acids, the cyclohexadiene dicarboxylic acids, the alkyl cycloalkane polycarboxylic acids, etc. The only requisite of the polycarboxylic acid (or an anhydride thereof if available) is that it have at least two esterifiable carboxy groups.

Certain of the 3-hydroxy alkene-1 polyesters used in carrying the present invention into effect, for example the 3-hydroxy alkene-1 polyesters of non-ethylenic polycarboxylic acids, are, in themselves, relatively inactive polymerizing bodies. This is evidenced by subjecting such polyesters to heat, say of the order of 50° to 100° C., in the presence of a super-peroxide such as acetyl or benzoyl peroxide. Whereas vinyl acetate and ethyl methacrylate, for example, are converted to a solid polymer in less than 5 hours at 100° C. when admixed with 1% by weight benzoyl peroxide, a 3-hydroxy alkene-1 polyester of a non-ethylenic polycarboxylic acid, specifically di-(buten-1-yl-3) succinate containing 1% by weight benzoyl peroxide showed no appreciable change in viscosity when heated for about 200 hours at 85° C.

On the other hand, the unsaturated alkyd resins alone are unsuited, even in the presence of polymerization catalysts such as peroxides, for the preparation of practically useful massive bodies. With or without peroxides or other polymerization catalysts, however, they may be applied in film form and, under the influence of heat or light, or heat and light, may be converted in a reasonable time to a cured film. But if effort be made to prepare commercially useful massive bodies from the unsaturated alkyds alone, heat treatment even for 24 hours in the presence of a polymerization catalyst such as superperoxides usually gives unsuitable materials, that is, they generally lack the properties required for the usual service applications. For example, the cast or molded articles often are soft, rubbery masses (even after heat treatment for 24 hours at elevated temperatures) or, if hard bodies, frequently are filled with bubbles or show cracks, or both, when cured.

It was therefore quite surprising and unexpected to find that by copolymerizing a 3-hydroxy alkene-1 polyester and an unsaturated alkyd resin, interpolymers were obtained having properties quite different from the properties of the individual components when polymerized under the same conditions. The properties of the interpolymers range, for example, from hard, tough, insoluble and infusible bodies both in film form and when cast or molded in large size to softer, flexible bodies or rubbery masses. In general, the properties of these new products are such as to render them suitable for a wide variety of technical applications.

Another practical advantage accruing from my invention is that the 3-hydroxy alkene-1 polyesters are good dispersion mediums for polymerization catalysts such as super-peroxides, which catalysts are dissolved or dispersed in the unsaturated alkyd resins alone only with great difficulty.

In carrying the present invention into effect an esterification product of a polyhydric alcohol and an alpha unsaturated alpha beta polycarboxylic acid is first prepared in accordance with technique now well known to those skilled in the alkyd-resin art. Any polyhydric alcohol containing at least two esterifiable aliphatic hydroxyl groups, or mixtures of such alcohols, may be used in preparing the unsaturated alkyd resin. Examples of such polyhydric alcohols are ethylene glycol, di-, tri- and tetra-ethylene glycols, propylene glycol, trimethylene glycol, thiodiglycol, glycerine, pentaerythritol, etc. Any alpha unsaturated alpha beta polycarboxylic acid (examples of which previously have been given), or mixtures of such acids, may be reacted with the polyhydric alcohol or alcohols to form the unsaturated alkyd resin. If available, anhydrides of these polycarboxylic acids may be employed. The terms "polycarboxylic acid" and "dicarboxylic acid," as used generally herein and in the appended claims, are intended to include within their meaning the anhydrides of such acids.

In some cases, instead of using an unmodified unsaturated alkyd resin I may use a polymerizable unsaturated alkyd resin which has been internally modified by replacing a part, say up to about 75 mol per cent, of the unsaturated polycarboxylic acid with a non-ethylenic polycarboxylic acid, for example a saturated aliphatic polycarboxylic acid such as succinic, adipic, glutaric, pimelic, sebacic, azelaic, suberic, tricarballylic, etc., an aromatic polycarboxylic acid, e. g., phthalic, benzoyl phthalic, terephthalic, etc. Anhydrides of these acids, if available, also may be used.

The esterification products of polyhydric alcohols with ethylenic polycarboxylic acids (or with ethylenic and non-ethylenic polycarboxylic acids) may be further modified by introducing as a reactant in the preparation of the alkyd resin a mono-esterifiable compound or compounds, more particularly a saturated or unsaturated, normal or isomeric monohydric alcohol, a saturated or unsaturated monocarboxylic acid, or mixtures thereof, or both such esterifiable mono-hydroxy organic compounds. Examples of monohydric alcohols which may be used as modifiers of the alkyd resin are propyl, isopropyl, butyl, isobutyl, amyl, isoamyl, hexyl, octyl, decyl, dodecyl to octadecyl, inclusive, allyl, methallyl, 1-chlorallyl, 2-chlorallyl, crotyl, cinnamyl, 2-hydroxy butene-1, etc. The use of methyl and ethyl alcohols is not precluded, but in general these alcohols are less satisfactory because of their lower boiling points. As monobasic acids may be used, for example, the unsubstituted saturated and unsaturated, normal or isomeric acids containing only one esterifiable group such acetic, propionic, butyric to stearic, inclusive, benzoic, acrylic, methacrylic, cinnamic, acids of drying, semi-drying and non-drying oils, e. g., the acids of tung oil, linseed oil, soya bean oil, castor oil, etc. The mono-esterifiable compound may be introduced into the esterification product before, during or after the esterification of the polyhydric alcohol with the polycarboxylic acid under conditions that interesterification of the monoesterifiable compound with the incompletely esterified polyhydric alcohol-polycarboxylic acid reaction product is attained. That is, the monoesterifiable compound must be introduced into the reaction mass before all of the said groups of the polybasic acid or all of the alcohol groups of the polyhydric alcohol have been esterified.

The term "unsaturated alkyd resin" as used generally herein and in the appended claims is intended to include within its meaning both unmodified esterification products of a polyhydric alcohol with an alpha unsaturated alpha beta polycarboxylic acid and esterification products of the said components which have been modified, for example, as above briefly described.

To achieve copolymerization of the unsaturated alkyd resin with the 3-hydroxy alkene-1 polyester, a solution of the said resin in the said polyester first preferably is effected. The alkene-1 polyester also advantageously may act as the carrier for a small amount of a polymerization catalyst. Examples of polymerization catalysts which may be used are ozone, ozonides, inorganic super-oxides such as barium peroxide, sodium peroxide, etc., aliphatic acyl peroxides, e. g., acetyl peroxide, lauryl peroxide, stearyl peroxide, etc., peroxides of the aromatic acid series, e. g., benzoyl peroxide, various per-compounds such as perborates, persulfates, perchlorates, etc., aluminum salts such as the halides, organic and inorganic acids such as methacrylic acid, hydrofluoric acid, etc., metal compounds of the unsaturated acids as, for instance, cobalt and manganese resinates, linoleates, maleates, etc. Benzoyl peroxide is the preferred catalyst. Any suitable amount of catalyst may be used, but in general the catalyst concentration will be within the range of 0.1 to 2.0 per cent by weight of the whole.

When rapidity of interpolymerization between the 3-hydroxy alkene-1 polyester and the unsaturated alkyd resin is of secondary importance, copolymerization between these components may be effected merely under the influence of heat, light, or heat and light and in the absence of an accelerator of polymerization. The rate of copolymerization and the properties of the final product vary with the time, temperature and, if a catalyst is used, also with the catalyst concentration. Copolymerization may be effected at from room temperature (20° to 30° C.) to temperatures above 100° C., for example about 130°

C., but ordinarily I use temperatures within the range of 60° to 120° C. in causing the mixed components to interpolymerize.

Since the 3-hydroxy alkene-1 polyesters in and of themselves, that is in the absence of an unsaturated alkyd resin, polymerize, if at all, only to the extent that relatively low and not relatively high molecular weight bodies are formed, it may be considered that these polyesters function as "bridging agents" for the unsaturated alkyd resins with which they are incorporated.

In order that those skilled in the art better may understand how the present invention may be carried into effect, the following examples thereof are given by way of illustration. All parts are by weight.

PREPARATION OF 3-HYDROXY ALKENE-1 POLYESTER

*Example 1*

| | Parts |
|---|---|
| 3-hydroxy butene-1 | 260 |
| Succinic acid | 118 |
| Benzene | 100 |
| Sulfuric acid (concentrated) | 1 | were reacted in a continuous esterification apparatus until no more water of reaction was collected. When cool the benzene solution was washed free of acid with 10% sodium carbonate solution, dried over anhydrous sodium carbonate and distilled. 161 parts di-(buten-1-yl-3) succinate, boiling at 148° to 153° C. at 8 to 10 mm. pressure, was obtained.

In a similar manner the 3-hydroxy alkene-1 polyesters of other polycarboxylic acids may be prepared.

*Example 2*

| | Parts |
|---|---|
| Diethylene glycol maleate [1] | 90 |
| Di-(buten-1-yl-3) succinate | 20 |
| Benzoyl peroxide | 1 |

[1] Note.—The diethylene glycol maleate was prepared by esterifying 98 parts maleic anhydride with 106 parts diethylene glycol. The mixed reactants were heated in a nitrogen atmosphere, the temperature being brought to 190° C. in one hour and held at that temperature for about 3 to 5 hours.

The benzoyl peroxide was dissolved in the di-(buten-1-yl-3) succinate and the resulting solution was mixed with the diethylene glycol maleate, resulting in a clear, homogeneous product. The mixture was then subjected to heat, specifically a temperature of about 85° to 90° C. In 10 minutes the mixture converted into an insoluble, infusible, extremely hard, glass-clear product. After 15 hours' heating, the resinous mass was only slightly harder than after 1 hour's heating. At 130° C. the mixed components are converted into an insoluble, infusible mass in about 30 to 45 seconds.

Fillers such as alpha cellulose, shredded cellulose derivatives, wood flour, asbestos, paper, cloth, etc., may be impregnated with the mixed unpolymerized or partially copolymerized components and the mass hardened under heat or under heat and pressure to yield moulded articles of good appearance and physical characteristics.

The solution of the above components also may be used in the production of electrically insulating tapes, commonly known as winding tapes. Thus, cellulose acetate ribbon may be immersed in the mixed components until a softening of the ribbon takes place. Excess material is readily removed from the cellulose ribbon by means of a doctor blade. The impregnated ribbon then may be wound as an insulation on wire and similar objects, and subjected in situ to a suitable heat treatment, for example about ½ to 3 hours at 100° to 130° C., until a solid, continuous, heat-resistant, highly adhesive surface coating is obtained.

It will be understood, of course, that my invention is not limited to interpolymerization products of diethylene glycol maleate and di-(buten-1-yl-3) succinate given in the above illustrative example and that instead of using a 3-hydroxy butene-1 polyester I may use any other 3-hydroxy alkene-1 polyester. For example, I may use the polyesters derived from 3-hydroxy pentene-1
3-hydroxy hexene-1
3-hydroxy 3-isopropyl propene-1
3-hydroxy heptene-1
3-hydroxy 3-secondary butyl propene-1
3-hydroxy 3-isobutyl propene-1
3-hydroxy 3-tertiary butyl propene-1
3-hydroxy octene-1
3-hydroxy 3-isoamyl propene-1
3-hydroxy 3-secondary amyl propene-1
3-hydroxy 3-tertiary amyl propene-1
3-hydroxy 3-phenyl propene-1
3-hydroxy 3-tolyl propene-1
3-hydroxy 3-xylyl propene-1
3-hydroxy 5-phenyl butene-1
3-hydroxy 5-tolyl butene-1
3-hydroxy 5-xylyl butene-1
3-hydroxy 3-naphthyl propene-1
3-hydroxy 4-chloro butene-1 and, more particularly, the esterification products of hydroxy alkenes such as above mentioned by way of illustration with polycarboxylic acids such as hereinbefore given by way of example, that is oxalic, malonic, succinic, phthalic, maleic, itaconic, fumaric, citric, tartaric, etc.

Likewise, instead of using diethylene glycol maleate, I may use any other modified or unmodified unsaturated alkyd resin. Thus, I may use the esterification products of, for example, Ethylene glycol (20 parts), maleic anhydride (29.4 parts) and succinic acid (3.3 parts)
Diethylene glycol (31.8 parts), maleic anhydride (27.9 parts) and tung oil acids (7.6 parts)
Ethylene glycol (12 parts), maleic anhydride (11.76 parts), linseed oil acids (10.1 parts) and phthalic anhydride (8.9 parts)
Diethylene glycol (30.6 parts), maleic anhydride (17.6 parts) and itaconic acid (15.6 parts)
Ethylene glycol (17.4 parts), maleic anhydride (28.8 parts) and stearic acid (3.4 parts)
Diethylene glycol (20.4 parts), maleic anhydride (16.6 parts) and soya bean acids (15.2 parts)
Glycerine (18.4 parts) and maleic anhydride (29.4 parts)
Diethylene glycol (30.3 parts), maleic anhydride (13.2 parts) and phthalic anhydride (21.7 parts)
Glycerine (25.76 parts), maleic anhydride (13.72 parts) and phthalic anhydride (20.72 parts)
Ethylene glycol (18 parts) and maleic anhydride (27.4 parts)
Diethylene glycol (160 parts) and maleic anhydride (147 parts)
Diethylene glycol (30.6 parts), maleic anhydride (27.93 parts) and decyl alcohol (4.7 parts)
Ethylene glycol (18 parts), maleic anhydride (29.4 parts), octyl alcohol (2.6 parts) and stearic acid (5.16 parts)
Ethylene glycol (17.7 parts), maleic anhydride (26.46 parts), and acetic anhydride (7.08 parts)
Diethylene glycol (35.4 parts), maleic anhydride (27.95 parts) and linseed oil acids (7.7 parts)
Ethylene glycol (18 parts), maleic anhydride (27.93 parts) and octyl alcohol (3.9 parts)
Ethylene glycol (35.4 parts), maleic anhydride (29.4 parts), octyl alcohol (13 parts) and acetic anhydride (11.8 parts)
Ethylene glycol (23 parts) and itaconic acid (52 parts)
Diethylene glycol (106 parts) and itaconic acid (130 parts)
Glycerine (18.4 parts) and itaconic acid (39 parts)
Diethylene glycol (19.6 parts), itaconic acid (26 parts) and stearic acid (2.25 parts)
Ethylene glycol (62.05 parts), itaconic acid (32.51 parts) and phthalic anhydride (111.03 parts)
Glycerine (20 parts), itaconic acid (29 parts) and phthalic anhydride (11 parts)
Diethylene glycol (20 parts), itaconic acid (18.2 parts) and succinic acid (7.08 parts)
Glycerine (12.2 parts), itaconic acid (19.5 parts) and linseed oil acids (14.2 parts)
Glycerine (65 parts), itaconic acid (16.5 parts), linseed oil fatty acids (140 parts) and phthalic anhydride (45 parts)
Glycerine (12.2 parts), itaconic acid (11.2 parts), phthalic anhydride (5.4 parts) and soya bean acids (13.9 parts)
Ethylene glycol (6 parts), itaconic acid (14.3 parts) and octadecyl alcohol (5.4 parts)
Ethylene glycol (10.6 parts), itaconic acid (14.4 parts) and decyl alcohol (3.7 parts)
Ethylene glycol (15 parts), itaconic acid (31 parts) and tung oil acids (65 parts)
Ethylene glycol (5.9 parts), itaconic acid (11.7 parts) and castor oil acids (25.8 parts)

Also, polymerization catalysts other than benzoyl peroxide may be employed, for instance accelerators of polymerization such as hereinbefore mentioned.

In certain cases, instead of copolymerizing a single 3-hydroxy alkene-1 polyester with a single unsaturated alkyd resin, I may copolymerize a plurality of such polyesters either with a single unsaturated alkyd resin or with a plurality of such resins. In this way it is possible to obtain a composition comprising a mixture of interpolymers best adapted to meet a particular service application.

Although in the foregoing example I have shown an interpolymerization product of a minor proportion (approximately 18 per cent by weight of the whole) of a 3-hydroxy alkene-1 polyester with a major proportion of an unsaturated alkyd resin, it will be understood of course that the invention is not limited to these particular proportions of components. Mainly for economic reasons I prefer that the 3-hydroxy alkene-1 polyester does not exceed substantially 50 per cent by weight of the mixed polymerizable materials, but the use of higher amounts is not precluded, as for example up to, say, 70 or 75 per cent by weight of the whole. Although the incorporation of a small amount, e. g., 1 or 2 per cent, of a 3-hydroxy alkene-1 polyester into a polymerizable unsaturated alkyd resin has a beneficial effect upon such alkyd resins, yielding products of improved properties as compared with unsaturated alkyd resins which have been polymerized in the absence of a 3-hydroxy alkene-1 polyester, somewhat better results are obtained when the said polyester constitutes at least 5 per cent by weight of the mixed starting components. In general, the proportions will be varied depending upon the particular properties desired in the interpolymer.

The interpolymerization products of this invention have a wide range of properties. Depending, for example, upon the particular 3-hydroxy alkene-1 polyester and the particular unsaturated alkyd resin employed, the particular proportions thereof, the particular polymerizing conditions and the extent of the interpolymerization, they vary from soft, flexible, soluble bodies to hard, rigid masses of varying resistance to solvents. In intermediate stages of copolymerization some form fluid compositions of varying intrinsic viscosities and may be so used. For coating or impregnating applications where the presence of a small amount of solvent in the cured composition is not objectionable, the mixed starting components may be diluted with volatile or non-volatile solvents to viscosities best adapted to meet the particular service application, and then may be copolymerized after application of the solution to the particular article to be coated or impregnated. By suitable selection of the starting materials and the conditions of the interpolymerization, interpolymers can be obtained in an insoluble, infusible state practically resistant to the destructive effect of other chemical bodies such as acids, bases, solvents and the like.

These new organic plastic materials may be used alone or with fillers or other modifying agents in casting and molding applications. The modified or unmodified copolymers may be used as adhesives, impregnants and surface coating materials. In such applications the mixed components, without added solvent, may be applied to the object to be treated and subjected to polymerization influences as hereinbefore described, with or without the application of pressure, to form the copolymer in situ. Thus, they may be used as impregnants for many porous bodies, such as cork, pottery, felts, or fabricated bodies with interstices, such as the windings of electrical coils, netted fibers, interwoven fibrous materials, etc. They also may be used for protectively coating impervious articles such as metals, or for coating or coating and impregnating articles such as paper, wood, cloth, glass fibers, concrete, synthetic boards, etc. They also may be employed in the production of wire enamels and winding tapes. The mixed components or partial interpolymers thereof, with or without modifying agents, may be cast and molded under heat or under heat and pressure. They also may be molded by injection, extrusion or compression molding technique whereby they are heat- and pressure-hardened to yield numerous molded articles of manufacture for various industrial, household and novelty uses.

What I claim as new and desire to secure by Letters Patent of the United States, is:

1. A polymerizable composition comprising (1) at least one polyester obtained by reaction of a polycarboxylic acid with a 3-hydroxy alkene-1 corresponding to the formula

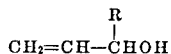

where R represents a monovalent hydrocarbon radical and (2) at least one unsaturated alkyd resin.

2. A composition comprising the product of polymerization of a mixture containing (1) at least one polyester obtained by reaction of a polycarboxylic acid with a 3-hydroxy alkene-1 corresponding to the formula $$CH_2=CH-\underset{R}{\overset{|}{C}}HOH$$

where R represents a monovalent hydrocarbon radical and (2) at least one unsaturated alkyd resin.

3. A composition comprising an interpolymer of (1) a polyester obtained by reaction of 3-hydroxy butene-1 with a polycarboxylic acid and (2) an unsaturated alkyd resin.

4. A composition comprising an interpolymer of (1) a polyester obtained by reaction of 3-hydroxy pentene-1 with a polycarboxylic acid and (2) an unsaturated alkyd resin.

5. As a new product, a copolymer of (1) a polyester obtained by reaction of an aromatic polycarboxylic acid with a 3-hydroxy alkene-1 corresponding to the formula $$CH_2=CH-\underset{R}{\overset{|}{C}}HOH$$

where R represents a monovalent hydrocarbon radical and (2) an unsaturated alkyd resin.

6. A product comprising an interpolymer of (1) a polyester obtained by reaction of a polycarboxylic acid with a 3-hydroxy alkene-1 corresponding to the formula $$CH_2=CH-\underset{R}{\overset{|}{C}}HOH$$

where R represents a monovalent hydrocarbon radical and (2) a polymerizable esterification product of ingredients comprising a polyhydric alcohol and an alpha unsaturated alpha beta polycarboxylic acid.

7. A composition comprising an interpolymer of (1) a polyester obtained by reaction of a polycarboxylic acid with a 3-hydroxy alkene-1 corresponding to the formula $$CH_2=CH-\underset{R}{\overset{|}{C}}HOH$$

where R represents a monovalent hydrocarbon radical and (2) a polyhydric alcohol ester of maleic acid.

8. A composition comprising an interpolymer of (1) a polyester obtained by reaction of 3-hydroxy butene-1 with a polycarboxylic acid and (2) a dihydric alcohol ester of an alpha unsaturated alpha beta dicarboxylic acid.

9. A composition comprising an interpolymer of di-(buten-1-yl-3) succinate and a dihydric alcohol ester of an alpha unsaturated alpha beta dicarboxylic acid.

10. A composition comprising an interpolymer of di-(buten-1-yl-3) phthalate and a dihydric alcohol ester of an alpha unsaturated alpha beta dicarboxylic acid.

11. A composition comprising an interpolymer of (1) a polyester obtained by reaction of a polycarboxylic acid with a 3-hydroxy alkene-1 corresponding to the formula $$CH_2=CH-\underset{R}{\overset{|}{C}}HOH$$

where R represents a monovalent hydrocarbon radical and (2) a polymerizable esterification product of a polyhydric alcohol, an alpha unsaturated alpha beta polycarboxylic acid and a polycarboxylic acid selected from the class consisting of saturated aliphatic polycarboxylic acids and aromatic polycarboxylic acids.

12. A composition comprising the product of polymerization of a mixture containing (1) a polyester obtained by reaction of a polycarboxylic acid with a 3-hydroxy alkene-1 corresponding to the formula $$CH_2=CH-\underset{R}{\overset{|}{C}}HOH$$

where R represents a monovalent hydrocarbon radical and (2) a polymerizable esterification product of ingredients comprising a polyhydric alcohol, a monohydric alcohol and an alpha unsaturated alpha beta polycarboxylic acid.

13. The product of polymerization of a mixture containing (1) an unsaturated alkyd resin and (2) a polyester obtained by reaction of a polycarboxylic acid with a 3-hydroxy alkene-1 corresponding to the formula $$CH_2=CH-\underset{R}{\overset{|}{C}}HOH$$

where R represents a monovalent hydrocarbon radical, said polyester constituting from 1 to 75 per cent by weight of the mixed starting components.

14. The product of polymerization of a mixture containing a dihydric alcohol ester of an alpha unsaturated alpha beta dicarboxylic acid and di-(buten-1-yl-3) phthalate in an amount corresponding to from 5 to 50 per cent by weight of the mixed starting components.

15. The method of producing new compositions especially adapted for molding, coating and adhesive applications which comprises mixing at least one polyester obtained by reaction of a polycarboxylic acid with a 3-hydroxy alkene-1 corresponding to the formula $$CH_2=CH-\underset{R}{\overset{|}{C}}HOH$$

where R represents a monovalent hydrocarbon radical with at least one unsaturated alkyd resin, and treating the resulting mixture to effect copolymerization between the said components.

16. A composition comprising the product of polymerization of a mixture containing (1) a polyester obtained by reaction of a polycarboxylic acid with a 3-hydroxy alkene-1 corresponding to the formula $$CH_2=CH-\underset{R}{\overset{|}{C}}HOH$$

where R represents a monovalent hydrocarbon radical and (2) a polymerizable esterification product of ingredients comprising a polyhydric alcohol, an alpha unsaturated alpha beta polycarboxylic acid and a monocarboxylic acid.

GAETANO F. D'ALELIO.